(12) United States Patent
Ishimaru et al.

(10) Patent No.: US 9,837,876 B2
(45) Date of Patent: Dec. 5, 2017

(54) MOTOR APPARATUS FOR VEHICLE

(71) Applicant: MITSUBISHI JIDOSHA KOGYO KABUSHIKI KAISHA, Tokyo (JP)

(72) Inventors: Eiji Ishimaru, Tokyo (JP); Ryunosuke Furusawa, Tokyo (JP)

(73) Assignee: MITSUBISHI JIDOSHA KOGYO KABUSHIKI KAISHA, Tokyo (JP)

( * ) Notice: Subject to any disclaimer, the term of this patent is extended or adjusted under 35 U.S.C. 154(b) by 332 days.

(21) Appl. No.: 14/853,535

(22) Filed: Sep. 14, 2015

(65) Prior Publication Data

US 2016/0105084 A1    Apr. 14, 2016

(30) Foreign Application Priority Data

Oct. 8, 2014    (JP) .................................. 2014-207365

(51) Int. Cl.
| | |
|---|---|
| *H02K 9/19* | (2006.01) |
| *H02K 5/15* | (2006.01) |
| *H02K 5/20* | (2006.01) |
| *H02K 5/22* | (2006.01) |
| *H02K 11/215* | (2016.01) |

(Continued)

(52) U.S. Cl.
CPC .............. *H02K 9/19* (2013.01); *H02K 5/15* (2013.01); *H02K 5/20* (2013.01); *H02K 5/22* (2013.01); *H02K 11/0073* (2013.01); *H02K 11/215* (2016.01); *H02K 11/33* (2016.01); *H02K 2211/03* (2013.01)

(58) Field of Classification Search
CPC ........ H02K 9/09; H02K 9/19; H02K 11/0073; H02K 11/21; H02K 5/15; H02K 5/225; H02K 5/04

USPC ........................................ 310/54, 52, 58, 64
See application file for complete search history.

(56) References Cited

U.S. PATENT DOCUMENTS

| | | | | |
|---|---|---|---|---|
| 5,034,638 A | * | 7/1991 | McCabria | ............... F16N 39/02 |
| | | | | 310/52 |
| 7,211,912 B2 | * | 5/2007 | Takenaka | ............... B60K 6/365 |
| | | | | 310/52 |

(Continued)

FOREIGN PATENT DOCUMENTS

| | | |
|---|---|---|
| JP | 2013-192374 A | 9/2013 |
| WO | WO 98/28833 A2 | 7/1998 |

(Continued)

OTHER PUBLICATIONS

Extended European Search Report dated May 4, 2016 received in corresponding European Application No. 15188843.5.

*Primary Examiner* — Hanh Nguyen
(74) *Attorney, Agent, or Firm* — Birch Stewart Kolasch & Birch, LLP

(57) ABSTRACT

A motor apparatus for a vehicle includes a motor unit, an inverter unit, a case, and a pump. The case has a motor space, an inverter space, and a cooling passage, the motor space accommodating the motor unit, the inverter space accommodating the inverter unit, the cooling passage being configured to let cooling medium flow through the cooling passage to cool the motor unit and the inverter unit. The pump is configured to forward the cooling medium to the cooling passage, and is disposed in a surrounding space within the motor space, the surrounding space being at a periphery of a rotation angle sensor fixed to a shaft of the motor unit.

12 Claims, 3 Drawing Sheets

(51) Int. Cl.
  *H02K 11/33*    (2016.01)
  *H02K 11/00*    (2016.01)

(56)            References Cited

U.S. PATENT DOCUMENTS

2008/0174190 A1*  7/2008  Kurata .................... H02K 1/18
                                                        310/54
2011/0169352 A1*  7/2011  Nagao .................... H02K 5/20
                                                        310/59
2013/0119794 A1   5/2013  Nagao et al.
2013/0241458 A1   9/2013  Soma et al.
2014/0077633 A1*  3/2014  Nagao .................... H02K 5/20
                                                        310/54

FOREIGN PATENT DOCUMENTS

WO    WO 2013/069319 A1    5/2013
WO    WO 2013/080747 A1    6/2013

* cited by examiner

MOTOR APPARATUS FOR VEHICLE

CROSS-REFERENCE TO THE RELATED APPLICATION

This application incorporates by references the subject matter of Application No. 2014-207365 filed in Japan on Oct. 8, 2014 on which a priority claim is based under 35 U.S.C. §119(a).

FIELD

The present invention relates to a motor apparatus (a prime mover in the form of an electric motor) for driving a vehicle.

BACKGROUND

An electric vehicle and a hybrid vehicle are equipped with a motor for running or driving the vehicle, and an inverter that generates AC power for driving the motor. The motor and the inverter are disposed near to each other, electrically connected to each other via, for example, a high voltage cable(s), and together compose a power plant.

Regarding this configuration, Patent Document 1 (Japanese Patent Laid-Open No. 2013-192374) discloses a device that accommodates both the motor and the inverter in a single case part to save the space and to reduce the number of components.

SUMMARY

Technical Problems

From the view point of saving the space, the device disclosed in Patent Document 1 preferably arranges the motor and the inverter in close proximity to each other within the single case part. However, since each of the motor and the inverter generates heat while operating, close arrangements of the motor and the inverter may hinder heat dissipation of the motor and the inverter. For this reason, it is desired to enhance a cooling performance for the motor and the inverter while saving space by disposing the motor and the inverter in proximity to each other.

With the foregoing problems in view, an object of the present invention is to provide a motor apparatus for a vehicle, the motor apparatus being capable of enhancing the cooling performance while saving space. Another object of the present invention is to achieve advantageous effects that cannot be achieved through the traditional art by employing the configurations described below in the embodiments of the present invention.

Solution to Problems (1) A disclosed motor apparatus for a vehicle includes a motor unit configured to generate power for driving the vehicle; an inverter unit configured to generate AC power for driving the motor unit; a case having a motor space, an inverter space, and a cooling passage, the motor space accommodating the motor unit, the inverter space accommodating the inverter unit, the cooling passage being configured to let cooling medium flow through the cooling passage to cool the motor unit and the inverter unit; and a pump disposed in a surrounding space within the motor space, the surrounding space being at a periphery of a rotation angle sensor fixed to a shaft of the motor unit, the pump being configured to forward the cooling medium to the cooling passage.

Advantageous Effects

A disclosed motor apparatus for a vehicle can enhance cooling performance while saving space.

BRIEF DESCRIPTION OF DRAWINGS

The nature of this invention, as well as other objects and advantages thereof, will be explained in the following with reference to the accompanying drawings, in which like reference characters designate the same or similar parts throughout the figures and wherein:

FIG. 2 is a perspective view of the motor apparatus of FIG. 1 with the upper part of the motor apparatus seen through.

DESCRIPTION OF EMBODIMENTS

A motor apparatus for a vehicle will now be described with reference to the accompanying drawings. The embodiments described below are merely examples, and it is not intended to exclude various modifications and technical applications that are not described in the embodiments described below. The configurations of the embodiments can be carried out in various modified forms without departing from the subject matter of the embodiments, and can be selectively applied as occasion demands or can be combined suitably.

1. Configurations

A motor apparatus for a vehicle (hereinafter, simply referred to as "motor apparatus") according to this embodiment is mounted on an electric-powered vehicle, such as an electric vehicle and a hybrid vehicle, and converts electrical energy stored in batteries into mechanical energy. The motor apparatus (a prime mover in the form of an electric motor) is electrically connected to the batteries while mechanically connected to wheels. The motor apparatus generates rotational force from the electric power of the batteries, and transmits the rotational force to the wheels.

Figure 3:
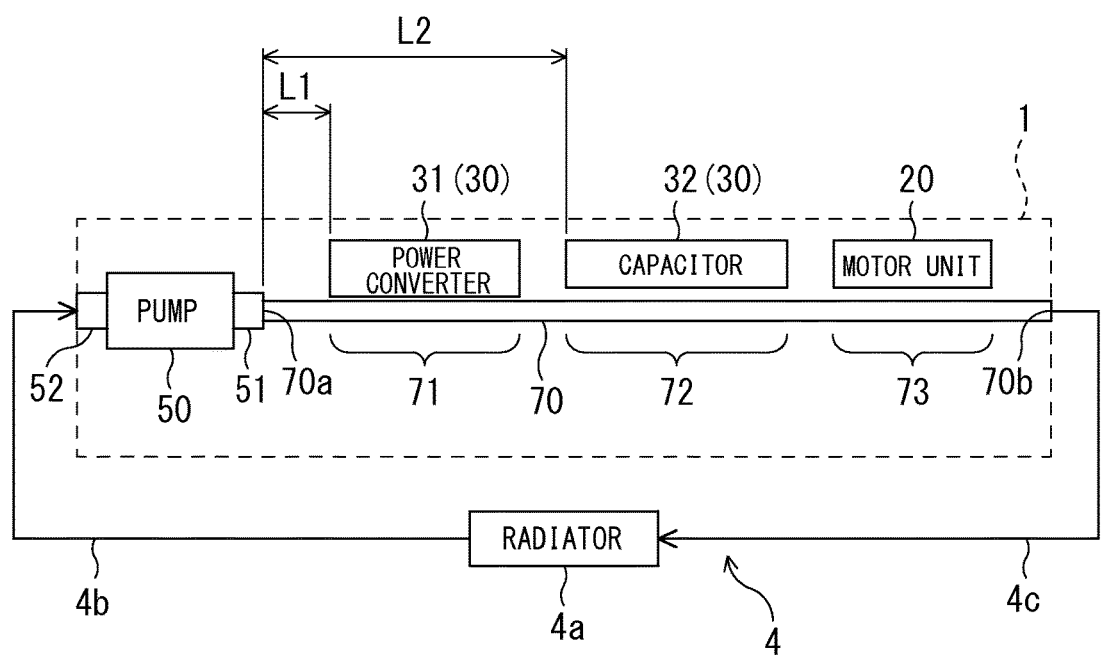
FIG. 3 is a block diagram illustrating the configurations of the motor apparatus of FIG. 1 and a cooling device.

As illustrated in FIG. 3, the motor apparatus 1 according to this embodiment includes a motor unit 20 that generates power for driving the vehicle, and an inverter unit 30 that converts DC power supplied from the batteries (not illustrated) into AC power and that supplies the AC power to the motor unit 20. Since the motor unit 20 and the inverter unit 30 each generate heat due to electrical resistance, mechanical friction, and the like while operating, the motor apparatus 1 is equipped with a cooling device 4 for cooling each of the motor unit 20 and the inverter unit 30.

The cooling device 4 includes a radiator 4a, and an upstream passage 4b and a downstream passage 4c each connecting the radiator 4a with the motor apparatus 1 in series. The cooling device 4 cools the motor apparatus 1 by circulating a coolant (cooling medium) between the radiator 4a and the motor apparatus 1. The radiator 4a is a heat dissipater that removes heat from the coolant. Each of the upstream passage 4b and the downstream passage 4c is formed of a pipe(s) or a hose(s), for example, and functions as a path through which the coolant flows.

The coolant cooled by the radiator 4a of the cooling device 4 is supplied to the motor apparatus 1 through the upstream passage 4b, and after flowing out of the motor apparatus 1, flows through the downstream passage 4c into the radiator 4a again to be cooled. The motor unit 20 and the inverter unit 30 are cooled by the coolant flowing through a cooling passage 70 formed in the inside of the motor apparatus 1 and in the vicinity of the motor unit 20 and the inverter unit 30. In other words, the coolant cools the motor unit 20 and the inverter unit 30 while flowing through the cooling passage 70.

Figure 1:
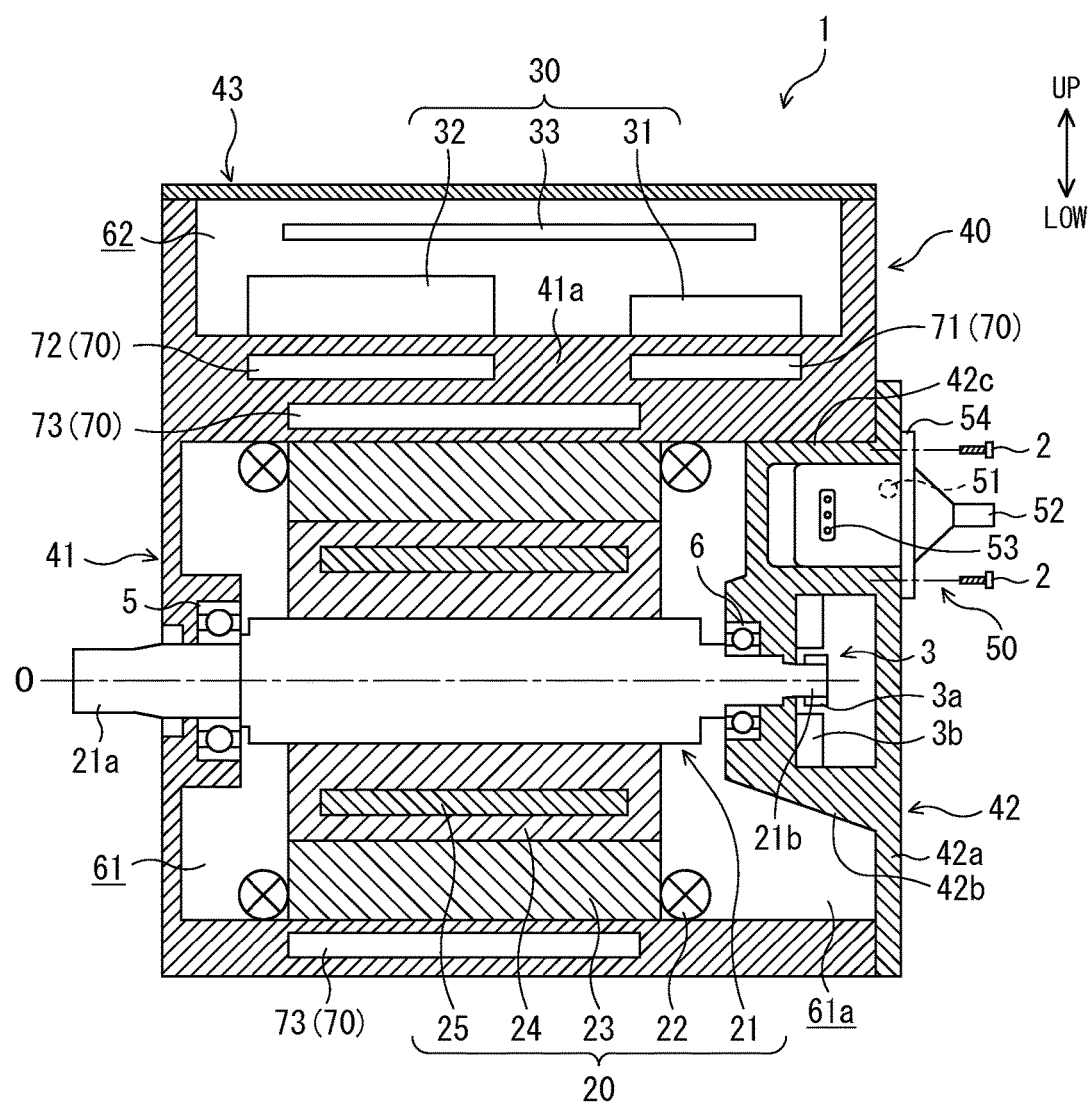
FIG. 1 shows a schematic longitudinal section of a motor apparatus for a vehicle according to an embodiment.
Figure 2:
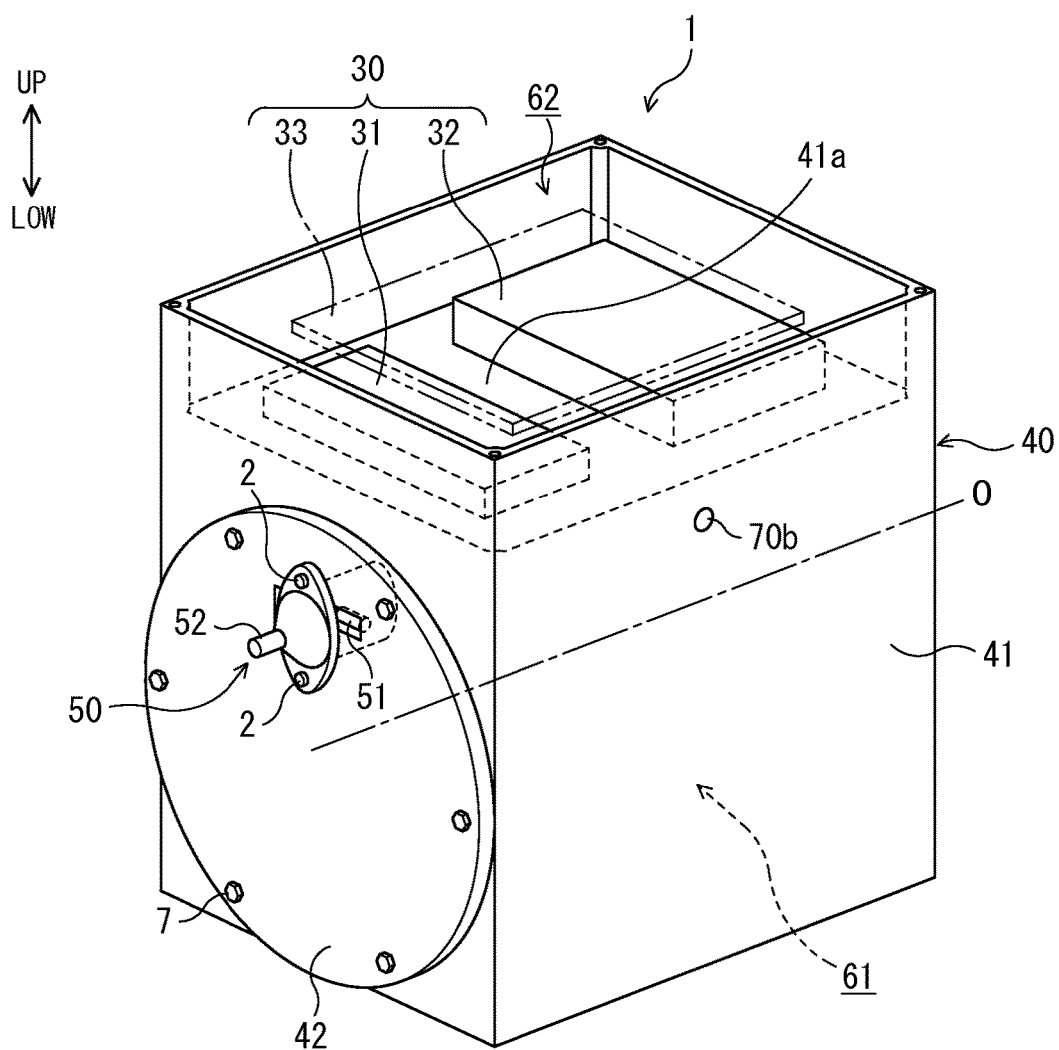

Hereinafter, the configuration of the motor apparatus 1 is to be described. FIG. 1 illustrates a section of the motor apparatus 1 without a pump 50 (to be described below), the section being imaginary cut across a vertical plane passing through a core axis O. FIG. 1 omits hatching that represents sectional surfaces for a shaft 21 of the motor unit 20, the inverter unit 30, a resolver 3, and bearings 5, 6 (each to be detailed later). FIG. 2 is a perspective view of the motor apparatus 1, and illustrates a control circuit 33 of the inverter unit 30 by two-dot chain lines while omitting a top lid 43 (each to be detailed later). In the following description, the gravitational direction is referred to as low direction, and the opposite direction of the gravitational direction is referred to as up direction. The motor apparatus 1 is to be mounted on the vehicle, keeping the orientation (of the vertical direction) illustrated in FIGS. 1 and 2.

As depicted in FIGS. 1 and 2, the motor apparatus 1 includes a case 40 and the pump 50 in addition to the motor unit 20 and the inverter unit 30. The case 40 has multiple rooms inside, and accommodates the motor unit 20 and the inverter unit 30. The pump 50 is fixed to the case 40. In this embodiment, the inverter unit 30 is accommodated in a room 62 (hereinafter, referred to as "inverter space 62") disposed at an upper portion of the inside of the case 40, while the motor unit 20 is accommodated in a room 61 (hereinafter, referred to as "motor space 61") disposed below the inverter space 62.

Firstly, the configuration of the inverter unit 30 is to be detailed. The inverter unit 30 is configured to operate using the power of the batteries as the power source, and to convert DC power supplied from the batteries into AC power (i.e. the inverter unit 30 is configured to generate AC power) for driving the motor unit 20, and to supply the AC power to the motor unit 20. The inverter unit 30 includes a power converter 31, a capacitor 32, and the control circuit 33.

The power converter 31 includes multiple switching elements, such as thyristors and transistors called IGBT (Insulated Gate Bipolar Transistor), and is configured to convert DC power into AC power by turning on and off the switching elements. The capacitor 32 is disposed on an electrical circuit connecting the batteries and the power converter 31, and is configured to smooth the DC power supplied from the batteries. The control circuit 33 takes the form of a control board, and is configured to control the on/off state of the switching elements included in the power converter 31.

Among the elements of the inverter unit 30, the power converter 31 and the capacitor 32, especially, tend to have elevated temperatures since each of the power converter 31 and the capacitor 32 generates large amount of heat due to large current flowing from the batteries. To deal with this inconvenience, as shown in FIG. 1, the cooling passage 70 (a first part 71 and a second part 72 each to be detailed later) is disposed in proximity to the power converter 31 and the capacitor 32 to cool the power converter 31 and the capacitor 32.

Next, the configuration of the motor unit 20 is to be detailed. The motor unit 20 is configured to generate rotational force to be transmitted to the wheels (not shown) by rotating a rotor with the AC power generated in the inverter unit 30. The motor unit 20 configures a three-phase AC motor. As illustrated in FIG. 1, the motor unit 20 includes the rotor constituted by the shaft 21 and a rotor core 24 being fixed to the periphery of the shaft 21 and having a magnet(s) 25 embedded in the rotor core 24. The motor unit 20 further includes a stator constituted by a number of stator cores 23 arranged along the circumference of the rotor core 24 at constant intervals, and coils 22 wound around the respective stator cores 23. Each of the stator cores 23 is fixed to an inner wall of the case 40, the inner wall surrounding the motor space 61.

The shaft 21 of this embodiment is disposed so as to have the core axis O extending horizontally, and is rotatably supported by two bearings 5, 6 each fixed to the case 40. A first end 21a (the left end in FIG. 1, and hereinafter also referred to as "output end 21a") of the shaft 21 protrudes outside the case 40, and is connected to an axle via a gear box (not illustrated), for example. The other end or a second end 21b (the right end in FIG. 1, and hereinafter also referred to as "sensor end 21b") of the shaft 21 is received in a bulge portion 42b (to be described later) disposed in the motor space 61. The sensor end 21b is equipped with the resolver 3 (rotation angle sensor) for detecting a rotational angle of the shaft 21. Hereinafter, along the direction of the core axis O of the shaft 21, the side on which the first end 21a of the shaft 21 is disposed is also referred to as "first side", whereas the side on which the second end 21b is disposed is also referred to as "second side".

The resolver 3 includes a rotor 3a, a stator 3b, and output terminals (not illustrated). The resolver 3 is configured to output the rotational angle of the rotor 3a with respect to the stator 3b via the output terminals to a controller (not shown). The rotor 3a of the resolver 3 is fixed to the periphery of the sensor end 21b of the shaft 21 in a rotatable manner with respect to the stator 3b, and is rotatable together with the shaft 21. The stator 3b of the resolver 3 is disposed at the periphery of the rotor 3a, and is fixed to the bulge portion 42b.

Next, the configuration of the case 40 is to be described. As illustrated in FIGS. 1 and 2, the case 40 is a box-shaped member having a substantial cuboid appearance, and is constituted by a body 41, a side lid 42, and the top lid 43. The body 41, which is the main part of the case 40, has an entire rectangular top face opened, and includes a partition wall 41a (wall) extending along a horizontal plane at a height slightly lower than the height of the top edge of the body 41. The internal space of the body 41 is vertically separated into two rooms 61, 62 by the partition wall 41a. The body 41 has a hole formed on a side wall at the first side along the shaft 21, through which the hole the output end 21a of the shaft 21 is disposed. The body 41 also has an opening shaped in a substantial circle and formed on a side wall at the second side along the shaft 21. The hole and the opening of the body 41 are formed on respective parts of the side walls, the parts surrounding the lower room 61 (i.e., the motor space 61).

The top lid 43 is a cover that closes the opened top face of the body 41, and after being fixed to the top edge of the body 41 by bolts (not shown), composes a top wall of the case 40. The side lid 42 is a cover that closes the opening of the body 41, and after being fixed to the side wall on the second side of the body 41 by multiple (in FIG. 2, six) bolts 7, composes a side wall of the case 40 in cooperation with the body 41. The top lid 43 demarcates, in cooperation with the body 41, the inverter space 62 that accommodates the inverter unit 30, while the side lid 42 demarcates, in cooperation with the body 41, the motor space 61 that accommodates the motor unit 20.

As illustrated in FIG. 1, the case 40 has, in addition to the rooms 61, 62 that respectively function as the motor space 61 and the inverter space 62, the cooling passage 70 formed in the inside of the walls surrounding the rooms 61, 62.

The inverter space 62 of this embodiment is formed in a substantial cuboid. The power converter 31, the capacitor 32, and the control circuit 33 of the inverter unit 30 are disposed in the inverter space 62, and are spaced apart from one another. The power converter 31 and the capacitor 32 are fixed on an upper face of the partition wall 41a that separates the inverter space 62 from the motor space 61, whereas the control circuit 33 is fixed above the power converter 31 and the capacitor 32 via a bracket(s) (not illustrated). In this embodiment, the power converter 31 is disposed on the second side along the shaft 21, and the capacitor 32 is disposed on the first side along the shaft 21.

The motor space 61 of this embodiment has a cylinder-like shape having an axis extending horizontally. The motor unit 20 is accommodated in the motor space 61 in such a manner that the core axis O of the motor unit 20 substantially coincides with the axis of the motor space 61. The inner diameter of the motor space 61 is set slightly larger than the diameter of the motor unit 20 with the center at the core axis O. The length of the motor space 61 along the axis direction is set to the sum of the length of the space where the resolver 3 is disposed and the lengths of the rotor core 24, the stator core 23, and the coil 22 of the motor unit 20 along the axis direction. Namely, the motor space 61 provides a room 61a (hereinafter, referred to as "surrounding space 61a") for accommodating the resolver 3 at the side on which the sensor end 21b of the shaft 21 is received. The side lid 42 is placed in the surrounding space 61a.

The side lid 42 has a circular plate portion 42a formed in a disc shape, the bulge portion 42b protruding from the center of the circular plate portion 42a in a substantial truncated cone shape, and a pump accommodating portion 42c at a part of the outer circumference of the bulge portion 42b. The circular plate portion 42a has a diameter slightly larger than the inner diameter of the motor space 61. The circular plate portion 42a is fixed to the body 41 from the outside of the motor space 61, and closes the opening of the body 41. In contrast, the bulge portion 42b and the pump accommodating portion 42c are both placed in the surrounding space 61a of the motor space 61.

The bulge portion 42b is provided for pivotally supporting the shaft 21 and for fixing the resolver 3, and is disposed coaxially with the core axis O. The bulge portion 42b fixes thereto the stator 3b of the resolver 3 and the bearing 6 that rotatably supports the shaft 21. The bulge portion 42b has an outer diameter slightly larger than the outer diameter of the resolver 3 and sufficiently smaller than the inner diameter of the motor space 61.

The surrounding space 61a exists within the motor space 61 and at the periphery of the resolver 3 (specifically, between the outer circumference of the bulge portion 42b and the cylindrical inner wall of the body 41). The surrounding space 61a is an empty area generated by the disposition of the resolver 3 on the core axis O of the shaft 21, and is a dead space. In order to utilize this dead space or the surrounding space 61a effectively, the pump 50 that forwards the coolant to the cooling passage 70 is disposed in the surrounding space 61a. In this embodiment, the pump accommodating portion 42c is placed in the surrounding space 61a, and the pump 50 is disposed in the pump accommodating portion 42c. Namely, the pump 50 is integrated in the case 40.

As depicted in FIGS. 1 and 2, the pump 50 is an electric water pump, for example, and has a suctioning part 52 that draws the coolant into the pump 50, a discharging part 51 that forwards the coolant drawn by the suctioning part 52 to the cooling passage 70, a connection part 53 connected to an electric power source, and a flange part for attaching the pump 50. The suctioning part 52 projects outside the case 40, whereas the discharging part 51 protrudes from a side face of the pump 50, and is disposed at an inner side with respect to the outer face of the case 40 (specifically, the discharging part 51 is disposed within the circular plate portion 42a of the side lid 42). The connection part 53 protrudes from the side face of the pump 50 towards the opposite side of the discharging part 51. The flange 54 is an attaching portion for fixing the pump 50 to the case 40. The flange 54 is shaped in a substantial ellipse, and is disposed perpendicularly to the side face of the pump 50.

The pump accommodating portion 42c is a recess dented from the circular plate portion 42a toward the protruding direction of the bulge portion 42b, and has a shape conforming to the outer shape of the pump 50. The pump 50 is fixed to the pump accommodating portion 42c by being partially fit into the pump accommodating portion 42c. The pump accommodating portion 42c is a continuation of the bulge portion 42b, and is disposed at the upper portion of the surrounding space 61a (i.e., the upper side of the bulge portion 42b). The pump accommodating portion 42c is adjoined to the inverter unit 30 via the partition wall 41a. The pump accommodating portion 42c is provided with an opening (not shown) that is located in correspondence to the discharging part 51 of the pump 50 and that composes an upstream end 70a of the cooling passage 70 to be detailed later.

The pump 50 is fit into the pump accommodating portion 42c from outside the case 40, being oriented such that the longitudinal direction of the flange part 54 stands vertical, and is fixed to the circular plate portion 42a by bolts 2, 2 at two positions allocated vertically. With this arrangement, the suctioning part 52 is disposed outside the case 40, and protrudes in a direction parallel to the core axis O. In contrast, the discharging part 51 and the connection part 53 are both accommodated in the pump accommodating portion 42c. As illustrated in FIG. 3, the discharging part 51 is connected to the upstream end 70a of the cooling passage 70, while the suctioning part 52 is connected to the upstream passage 4b of the cooling device 4.

The cooling passage 70 functions as a flow path of the coolant (in other words, the cooling passage 70 is configured to let the coolant flow through the cooling passage 70) in the inside of the motor apparatus 1, and is formed in the inside of the walls including the partition wall 41a. The cooling passage 70 of this embodiment takes the form of a single flow path being continuous from the upstream end 70a (illustrated in FIG. 3) opening at the pump accommodating portion 42c to a downstream end 70b opening at a side face (i.e., the vertical side face parallel to the core axis O) of the body 41 as illustrated in FIG. 2. It should be noted that the position of the downstream end 70b is not particularly limited.

The cooling passage 70 includes the first cooling part 71 for cooling the power converter 31, the second cooling part 72 for cooling the capacitor 32, and a third cooling part 73 for cooling the motor unit 20. The first cooling part 71 takes a shape of a horizontal face extending in parallel with the bottom face of the power converter 31 in the inside of the partition wall 41*a*, so as to conform to the surface shape of the power converter 31. Similarly, the second cooling part 72 takes a shape of a horizontal face extending in parallel with the bottom face of the capacitor 32 in the inside of the partition wall 41*a*, so as to conform to the surface shape of the capacitor 32. In this embodiment, the first cooling part 71 and the second cooling part 72 are formed in the inside of the partition wall 41*a* and close to the upper surface of the partition wall 41*a*.

The third cooling part 73 is formed in a cylindrical shape extending in the inside of the wall surrounding the motor space 61 of the body 41 along the circumference of the motor unit 20. As illustrated in FIG. 1, the upper portion of the third cooling part 73 is formed in the inside of the partition wall 41*a*, close to the lower surface of the partition wall 41*a*, and vertically below the first cooling part 71 and the second cooling part 72.

The upstream end 70*a* of the cooling passage 70 is positioned at a relatively high position in the case 40 because the pump 50 is disposed above the resolver 3 (i.e., at the upper portion of the surrounding space 61*a*). This means that the coolant flowing into the upstream end 70*a* has relatively high potential energy, so that the coolant flows down into the cooling passage 70 with the help of gravity in addition to the discharging pressure applied by the pump 50. Further, since the inverter unit 30 is arranged above the motor space 61 while the pump 50 is arranged above the resolver 3, the distance between the pump 50 and the inverter unit 30 is shortened. Consequently, as shown in FIG. 3, the lengths (path lengths) L1, L2 of the cooling passage 70 from the discharging part 51 of the pump 50 to the first cooling part 71 and the second cooling part 72, respectively, are shortened.

The upstream end 70*a* of the cooling passage 70 is connected to the discharging part 51 of the pump 50, while the downstream end 70*b* of the cooling passage 70 is connected to the downstream passage 4*c* of the cooling device 4. In the cooling passage 70, the first cooling part 71, the second cooling part 72, and the third cooling part 73 are provided in this order from upstream to downstream. Namely, the first, the second, and the third cooling parts 71, 72, 73 are arranged in series, and the second cooling part 72 is provided downstream of the first cooling part 71 with respect to the discharging part 51 of the pump 50 (in other words, the second cooling part 72 is provided downstream of the first cooling part 71 when seen from the discharging part 51). This makes the cooling passage 70 have the length L1 from the discharging part 51 to the first cooling part 71 shorter than the length L2 from the discharging part 51 to the second cooling part 72. As a result, the coolant forwarded from the discharging part 51 reaches the first cooling part 71 before reaching the second cooling part 72.

Thus, the coolant cooled by the radiator 4*a* is forwarded to the cooling passage 70 by the pump 50, and firstly cools the power converter 31 while flowing through the first cooling part 71. The coolant secondly cools the capacitor 32 while flowing through the second cooling part 72, thirdly cools the motor unit 20 while flowing through the third cooling part 73, and then flows through the downstream end 70*b* to be ejected to the downstream passage 4*c*. As described above, the coolant immediately after passing the radiator 4*a* and having a depressed temperature is supplied to the first cooling part 71 before being supplied to the second cooling part 72 and the third cooling part 73. This enhances the cooling performance especially for the power converter 31.

2. Advantageous Effects (1) According to the motor apparatus 1 described above, the surrounding space 61*a* can be effectively utilized to save space since the pump 50 is disposed in the surrounding space 61*a* within the motor space 61 and at the periphery of the resolver 3. The surrounding space 61*a* is an empty area generated by the disposition of the resolver 3 on the shaft 21 of the motor unit 20, and is the dead space in the motor space 61. Since the motor apparatus 1 disposes the pump 50 in the dead space or the surrounding space 61*a*, the motor apparatus 1 can reduce the waste of the space inside the case 40, achieving an improvement in the space utilization of the interior of the case 40.

Further, since the pump 50 is disposed in the case 40 accommodating the motor unit 20 and the inverter unit 30, the coolant discharged by the pump 50 can be directly forwarded to the cooling passage 70 provided in the case 40, resulting in reduction in resistance (flow resistance) that acts on the coolant. Accordingly, the motor apparatus 1 can enhance the cooling performance for the motor unit 20 and the inverter unit 30. With this advantage, by reducing the size of the pump 50, for example, it is possible to cut down the cost and the weight of the motor apparatus 1 while keeping the cooling performance equivalent to that of the conventional apparatus.

In addition, since the pump 50 is disposed in the case 40 accommodating the motor unit 20 and the inverter unit 30, the number of components can be reduced as compared to a situation where the motor unit 20, the inverter unit 30, and the pump 50 are accommodated separately in respective (individual) cases. More specifically, it is possible to reduce the number of components including not only the case, but also brackets for attaching the case to the body of the vehicle, clips for attaching the pump 50, cables or hoses between the motor unit 20, the inverter unit 30, and the pump 50, and so on. This can reduce the weight of the motor apparatus 1 as well as the cost of the components, and can further reduce the assembly cost since assembling task is facilitated.

(2) According to the motor apparatus 1 described above, since the pump 50 is disposed above the resolver 3 (i.e., at the upper portion of the surrounding space 61*a*) when installed in the vehicle, the pump 50 can be positioned relatively high. As a result, it is possible to elevate the potential energy of the coolant to be forwarded to the cooling passage 70. This makes gravity promote the flow of the coolant when the coolant flows downwardly through the cooling passage 70, for example, and thereby the cooling performance can be enhanced. Additionally, since the pump 50 can be positioned away from the road, the pump 50 can be protected from stones bouncing from the road.

(3) According to the motor apparatus 1 described above, since the inverter unit 30 is arranged to be adjacent to the pump 50 via the partition wall 41*a* having the cooling passage 70, the coolant forwarded to the cooling passage 70 by the pump 50 can be firstly directed toward the inverter unit 30. This can enhance the cooling performance for the inverter unit 30, which tends to have a temperature higher than a temperature of the motor unit 20.

(4) According to the motor apparatus 1 described above, since the length L1 of the cooling passage 70 from the discharging part 51 of the pump 50 to the first cooling part 71 is shorter than the length L2 of the cooling passage 70 from the discharging part 51 to the second cooling part 72, the resistance that acts on the coolant flowing from the discharging part 51 to the first cooling part 71 becomes smaller than the resistance that acts on the coolant flowing from the discharging part 51 to the second cooling part 72. This can make the cooling performance for the power converter 31 higher than the cooling performance for the capacitor 32. Accordingly, it is possible to enhance the cooling performance especially for the power converter 31, which tends to have a temperature higher than a temperature of the capacitor 32, so that the reliability of the inverter unit 30 can be enhanced.

Particularly, it is possible to shorten the length L1 of the cooling passage 70 from the discharging part 51 to the first cooling part 71 because the pump 50 is disposed in the surrounding space 61a and brings the discharging part 51 close to the upstream end 70a of the cooling passage 70. This can further reduce the resistance that acts on the coolant flowing from the discharging part 51 to the first cooling part 71. As a result, the first cooling part 71 can be supplied with the coolant having a far lower temperature. Thus, the cooling performance for the inverter unit 30 can be enhanced.

(5) According to the motor apparatus 1 described above, since the second cooling part 72 is provided downstream of the first cooling part 71 with respect to the discharging part 51 of the pump 50, it is possible to simplify the structure of the cooling passage 70 while enhancing the cooling performance for the inverter unit 30.

(6) According to the motor apparatus 1 described above, the pump 50 can be disposed close to the inverter unit 30 since the inverter space 62 is arranged above the motor space 61 and the pump 50 is arranged above the resolver 3 (i.e., at the upper portion of the surrounding space 61a). This can shorten the length L1 of the cooling passage 70 from the discharging part 51 of the pump 50 to the first cooling part 71 and the length L2 of the cooling passage 70 from the discharging part 51 to the second cooling part 72. Accordingly, it is possible to lower the resistance that acts on the coolant flowing to the first and the second cooling parts 71, 72, as described above, resulting in enhancement in the cooling performance for both of the power converter 31 and the capacitor 32.

3. Modifications

The present invention should not be limited to the above embodiment, and may be modified in various ways within the subject matter of the embodiment. The configurations in the above embodiment may be selected as needed or combined appropriately.

Although the cooling medium exemplified in the above embodiment is the coolant, other cooling medium applicable to the motor apparatus 1 may be water, antifreeze liquid, cooling oil, or air, for example.

Further, the position, the structure, and the number of the pump 50 may be changed. The position of the pump 50 is not particularly limited to the upper portion of the surrounding space 61a (above the resolver 3), and may be any position within the surrounding space 61a, such as a position lateral to or below the resolver 3. Further, the above embodiment illustrates a structure where the pump 50 is fit into the pump accommodating portion 42c and has the flange part 54 fixed to the circular plate portion 42a. Alternatively, the pump 50 may omit the flange part 54 and have the body of the pump 50 fixed to the pump accommodating portion 42c, for example. Conversely, the pump accommodating portion 42c may be omitted and the pump 50 may be fixed to the case 40 only at the flange part 54. Further, two or more pumps may be provided to the surrounding space 61a, for example, to enhance the cooling performance by increasing the discharging rate of the cooling medium to be forwarded to the cooling passage 70.

The shape of the case 40, and the shapes and the positions of the motor space 61 and the inverter space 62 are not limited to those of the above. The motor space and the inverter space may each be shaped in a substantial cuboid, or may be aligned horizontally, for example. Further, the above arrangement, of each element 31-33 of the inverter unit 30 is merely an example, and may be modified. For example, the power converter 31 may be disposed on the side of the output end 21a of the shaft 21 while the capacitor 32 may be disposed on the side of the sensor end 21b, or the power converter 31 and the capacitor 32 may be aligned in a direction that crosses the core axis O. Alternatively, two or three inverter spaces may be provided in the case 40 to accommodate one or two of the power converter 31, the capacitor 32, and the control circuit 33 individually.

Although the above embodiment illustrates the motor unit 20 disposed such that the core axis O of the shaft 21 extends horizontally, the extending direction of the core axis O of the shaft 21 is not limited to a horizontal direction, and may be changed.

Further, the rotation angle sensor fixed to the shaft of the motor apparatus is not limited to the above resolver 3, and may alternatively be a rotary encoder, for example.

The invention thus described, it will be obvious that the same may be varied in many ways. Such variations are not to be regarded as a departure from the purpose and scope of the invention, and all such modifications as would be obvious to one skilled in the art are intended to be included within the scope of the following claims.

REFERENCE SIGNS LIST 1 motor apparatus (motor apparatus for vehicle)
3 resolver (rotation angle sensor)
20 motor unit
21 shaft
30 inverter unit
31 power converter
32 capacitor
33 control circuit
40 case
41a partition wall (wall)
50 pump
51 discharging part
61 motor space
61a surrounding space
62 inverter space
70 cooling passage
71 first cooling part
72 second cooling part
73 third cooling part

What is claimed is:

1. A motor apparatus for a vehicle, the motor apparatus comprising:
a motor unit configured to generate power for driving the vehicle;
an inverter unit configured to generate AC power for driving the motor unit;
a case having a motor space, an inverter space, and a cooling passage, the motor space accommodating the motor unit, the inverter space accommodating the inverter unit, the cooling passage being configured to let cooling medium flow through the cooling passage to cool the motor unit and the inverter unit; and a pump disposed in a surrounding space within the motor space, the surrounding space being at a periphery of a rotation angle sensor fixed to a shaft of the motor unit, the pump being configured to forward the cooling medium to the cooling passage.

2. The motor apparatus according to claim 1, wherein the pump is arranged above the rotation angle sensor when being installed in the vehicle.

3. The motor apparatus according to claim 2, wherein the inverter unit is arranged to be adjacent to the pump via a wall having the cooling passage.

4. The motor apparatus according to claim 3, wherein:
the inverter unit includes a capacitor configured to smooth DC power and a power converter having a plurality of switching elements; and
the cooling passage includes a first cooling part configured to cool the power converter and a second cooling part configured to cool the capacitor, a length of the cooling passage from a discharging part of the pump to the first cooling part being shorter than a length of the cooling passage from the discharging part to the second cooling part.

5. The motor apparatus according to claim 4, wherein the second cooling part is provided downstream of the first cooling part with respect to the discharging part.

6. The motor apparatus according to claim 2, wherein:
the inverter unit includes a capacitor configured to smooth DC power and a power converter having a plurality of switching elements; and
the cooling passage includes a first cooling part configured to cool the power converter and a second cooling part configured to cool the capacitor, a length of the cooling passage from a discharging part of the pump to the first cooling part being shorter than a length of the cooling passage from the discharging part to the second cooling part.

7. The motor apparatus according to claim 6, wherein the second cooling part is provided downstream of the first cooling part with respect to the discharging part.

8. The motor apparatus according to claim 1, wherein the inverter unit is arranged to be adjacent to the pump via a wall having the cooling passage.

9. The motor apparatus according to claim 8, wherein:
the inverter unit includes a capacitor configured to smooth DC power and a power converter having a plurality of switching elements; and
the cooling passage includes a first cooling part configured to cool the power converter and a second cooling part configured to cool the capacitor, a length of the cooling passage from a discharging part of the pump to the first cooling part being shorter than a length of the cooling passage from the discharging part to the second cooling part.

10. The motor apparatus according to claim 9, wherein the second cooling part is provided downstream of the first cooling part with respect to the discharging part.

11. The motor apparatus according to claim 1, wherein:
the inverter unit includes a capacitor configured to smooth DC power and a power converter having a plurality of switching elements; and
the cooling passage includes a first cooling part configured to cool the power converter and a second cooling part configured to cool the capacitor, a length of the cooling passage from a discharging part of the pump to the first cooling part being shorter than a length of the cooling passage from the discharging part to the second cooling part.

12. The motor apparatus according to claim 11, wherein the second cooling part is provided downstream of the first cooling part with respect to the discharging part.

* * * * *